(12) United States Patent
Metzgen

(10) Patent No.: US 11,892,968 B2
(45) Date of Patent: Feb. 6, 2024

(54) INTERCONNECT CIRCUIT

(71) Applicant: Silicon Tailor Limited, London (GB)

(72) Inventor: Paul James Metzgen, London (GB)

(73) Assignee: Silicon Tailor Limited, Putney (GB)

( * ) Notice: Subject to any disclaimer, the term of this patent is extended or adjusted under 35 U.S.C. 154(b) by 7 days.

(21) Appl. No.: 17/870,715

(22) Filed: Jul. 21, 2022

(65) Prior Publication Data

US 2023/0023021 A1 Jan. 26, 2023

(30) Foreign Application Priority Data

Jul. 23, 2021 (GB) ...................................... 2110616

(51) Int. Cl.
*G06F 15/173* (2006.01)
(52) U.S. Cl.
CPC .............................. *G06F 15/17375* (2013.01)
(58) Field of Classification Search
CPC ................................................ G06F 15/17375
See application file for complete search history.

(56) References Cited

U.S. PATENT DOCUMENTS

| 6,335,930 B1 | 1/2002 | Lee |
| 2012/0056681 A1* | 3/2012 | Lee .......................... H03F 1/223 330/310 |

(Continued)

FOREIGN PATENT DOCUMENTS

WO WO 2011/148320 A1 12/2011

OTHER PUBLICATIONS

Choma, John, "Coupled inductor, constant resistance, broadband delay filter", published online Dec. 4, 2007, "Analog integrated circuits and signal processing", 2008 edition, pp. 7-20 (Year: 2007).*

(Continued)

*Primary Examiner* — Henry Tsai
*Assistant Examiner* — John B Roche
(74) *Attorney, Agent, or Firm* — Fish & Richardson P.C.

(57) ABSTRACT

A circuit having multiple inputs and multiple outputs the circuit being for switching signals received at any of the inputs to any of the outputs, the circuit comprising: a first switch matrix, the first switch matrix being capable of directing signals received at the inputs of the circuit to multiple first intermediate ports; a second switch matrix, the second switch matrix being capable of directing signals received at multiple second intermediate ports to multiple third intermediate ports, the number of the second intermediate ports being less than the number of the inputs of the circuit; one or more primary bypass links, each primary bypass link being capable of coupling one or more of the first intermediate ports to a respective one or more of the outputs of the circuit independently of the second switch matrix; a first redirection layer, the first redirection layer being capable of, for each first intermediate port, directing a signal received at that first intermediate port to a primary bypass link or to a second intermediate port; and a second redirection layer, the second redirection layer being capable of directing signals received at each of the primary bypass links to a respective one or more outputs of the circuit, and directing signals received at each of the third intermediate ports to a respective one or more outputs of the circuit.

20 Claims, 8 Drawing Sheets

(56) References Cited

U.S. PATENT DOCUMENTS

| | | | | |
|---|---|---|---|---|
| 2012/0306417 A1* | 12/2012 | Schwarz | ........... | H02M 7/53871 |
| | | | | 318/400.26 |
| 2015/0179098 A1* | 6/2015 | Kuang | .................. | H05B 45/00 |
| | | | | 345/211 |
| 2016/0056774 A1* | 2/2016 | Ilkov | ........................ | H03F 3/19 |
| | | | | 330/251 |

OTHER PUBLICATIONS

Venkatakrishnan, Shaileshh Bojaa et al., "Costly circuits, submodular schedules and approximate Carathéodory Theorems", published online Sep. 21, 2017, "Queuing systems", 2018 edition, pp. 311-347 (Year: 2017).*

Kumar, Vikash et al., "A CMOS active inductor based digital and analog dual tuned voltage-controlled oscillator", published online Jun. 1, 2017, "Microsyst Technol", 2019 edition, pp. 1571-1583 (Year: 2017).*

Zhang, Yi, "A Toolbox of Optimized Silicon Photonics Devices", 2014, University of Washington. 100 pages (Year: 2014).*

Oh, Hyunok, "Port Based Actor Model with Kahn Process Network Model and Decidable Dataflow Model", published online Jun. 12, 2012, "J Sign Process Syst.", 2013, pp. 75-88 (Year: 2012).*

GB Search Report for corresponding Appl No. 2110616.6, dated May 3, 2022.

* cited by examiner

INTERCONNECT CIRCUIT

CROSS-REFERENCE TO RELATED APPLICATIONS

This application claims priority to GB Patent Application No. 2110616.6, filed on Jul. 23, 2021, the entire contents of which are hereby incorporated by reference.

BACKGROUND

The present invention relates to a circuit having multiple inputs and multiple outputs, the circuit being for switching signals received at any of the inputs to any of the outputs.

A circuit capable of switching signals received at any of its inputs to any of its outputs may be referred to herein as an interconnect circuit. FIG. 1 shows a schematic example of an interconnect circuit 100 having multiple inputs 102 and multiple outputs 104. Interconnect circuit 100 shown in FIG. 1 has eight inputs 102 (often referred to as "input ports"), labelled A0, A1, A2, A3, A4, A5, A6, and A7. Interconnect circuit 100 shown in FIG. 1 has eight outputs 104 (often referred to as "output ports"), labelled B0, B1, B2, B3, B4, B5, B6, and B7. It is to be understood that interconnect circuits may have any number of inputs and outputs. Interconnect circuit 100 is capable of switching signals received at any of the inputs 102 to any of the outputs 104 using switch matrix 106. For example, a signal received at input A0 can be directed by switch matrix 106 to any of outputs B0, B1, B2, B3, B4, B5, B6, and B7. The same could be said for any of inputs A1, A2, A3, A4, A5, A6, and A7. Interconnect circuit 100 is capable of simultaneously directing signals received at multiple inputs to multiple respective outputs. Switch matrix 106 could be implemented using any one of various known switch network architectures—e.g. Omega or Clos networks, as will be described in further detail herein.

Interconnect circuits can be used for conveying data. For example, one or more interconnect circuits may be used in a system-on-chip application to convey data from a memory (e.g. on-chip RAM) to a processing unit (e.g. a CPU, or a specialised processing unit such as a GPU or TPU), between processing units, or between any other entities in any other suitable applications as would be well understood by the skilled person. A signal traversing an interconnect circuit may carry a data packet or word, or information in any other format as would be well understood by the skilled person.

Returning to FIG. 1, a signal received at one of the inputs 102 may comprise a payload (e.g. the data to be conveyed) and information indicating which of the outputs 104 to which that signal is addressed. For example, a signal received at input A2 may include information indicating that it is addressed to output B7. This information can be used by control logic of the switch matrix 106 so as to direct that signal from the input at which it is received to the output to which it is addressed.

That said, it is known that interconnect circuits suffer from "blocking"—as would be well understood by the skilled person. For example, blocking can occur when two signals reach an internal node (e.g. switch) of an interconnect circuit at substantially the same time, both signals needing to be directed to the same output of that internal node in order to follow a signal path to the output 104 of the interconnect circuit to which they are addressed. When this occurs, one of those signals may be successfully directed to the output 104 to which it is addressed, whilst the other signal, if no alternative signal paths to the output 104 to which it is addressed are available, is directed to another output to which it was not addressed. The signal that has been directed to an output to which it was not addressed can be referred to as a "blocked signal".

A new instance of the payload of the blocked signal can be generated and provided on a signal to the inputs 102 so as to re-attempt switching to the output to which it is addressed.

As a result, the latency experienced conveying that payload via the interconnect circuit is significantly increased—e.g. as it must traverse the switch matrix 106 at least twice before arriving at the output to which it is addressed. Therefore, it is desirable to reduce the occurrence of blocking in interconnect circuits.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

According to a first aspect of the present invention there is provided a circuit having multiple inputs and multiple outputs the circuit being for switching signals received at any of the inputs to any of the outputs, the circuit comprising: a first switch matrix, the first switch matrix being capable of directing signals received at the inputs of the circuit to multiple first intermediate ports; a second switch matrix, the second switch matrix being capable of directing signals received at multiple second intermediate ports to multiple third intermediate ports, the number of the second intermediate ports being less than the number of the inputs of the circuit; one or more primary bypass links, each primary bypass link being capable of coupling one or more of the first intermediate ports to a respective one or more of the outputs of the circuit independently of the second switch matrix; and a first redirection layer, the first redirection layer being capable of, for each first intermediate port, directing a signal received at that first intermediate port to a primary bypass link or to a second intermediate port.

The circuit may also comprise a second redirection layer, the second redirection layer being capable of directing signals received at each of the primary bypass links to a respective one or more outputs of the circuit, and directing signals received at each of the third intermediate ports to a respective one or more outputs of the circuit.

The number of the second intermediate ports may be half the number of the inputs of the circuit.

The number of the first intermediate ports may be equal to the number of the outputs of the circuit. The number of the first intermediate ports may be equal to the number of the inputs of the circuit.

The first switch matrix may be capable of directing signals received at any of the inputs of the circuit to any of the first intermediate ports.

The second switch matrix may be capable of directing signals received at any of the multiple second intermediate ports to any of the multiple third intermediate ports.

The first redirection layer may be capable of, for each first intermediate port, directing a signal received at that first intermediate port to a primary bypass link or to a second intermediate port in preference on whether that signal is addressed to an output to which that first intermediate port is capable of being coupled via that primary bypass link.

The first redirection layer may be configured to, for each first intermediate port: preferentially direct a signal received at that first intermediate port to a primary bypass link if that signal is addressed to an output to which that first intermediate port is arranged to be coupled via that primary bypass link; and preferentially direct a signal received at that first intermediate port to a second intermediate port if that signal is not addressed to an output to which that first intermediate port is arranged to be coupled via that primary bypass link.

The first switch matrix may comprise one or more switches, each switch capable of directing signals received at any of m inputs thereto to any of m outputs thereof, where m>1.

The second switch matrix may comprise one or more switches, each switch capable of directing signals received at any of p inputs thereto to any of p outputs thereof, where p>1.

The first redirection layer may comprise one or more switches, each switch capable of directing signals received at any of its n inputs thereto to any of its n outputs thereof, where n>1.

Each switch of the first redirection layer may be provided with a respective primary bypass link for coupling n first intermediate ports to a respective one or more outputs of the circuit independently of the second switch matrix.

The second redirection layer may comprise one or more switches, each switch capable of directing signals received at any of its n inputs thereto to any of its n outputs thereof, where n>1, the first redirection layer and the second redirection layer having the same number of switches.

Each primary bypass link may connect a switch of the first redirection later to a respective switch of the second redirection layer so as to couple n first intermediate ports to a respective n outputs of the circuit independently of the second switch matrix.

The first switch matrix may be capable of directing signals received at each of the inputs of the circuit to any one of the switches of the first redirection layer.

The circuit may be capable of coupling any individual one of the multiple inputs to any individual one of the multiple outputs via: (i) at least one signal path that traverses a primary bypass link and does not traverse the second switch matrix; and (ii) at least one different signal path that traverses the second switch matrix and does not traverse any of the one or more primary bypass links.

The second switch matrix may recursively comprise a circuit according to the principles described herein. The second switch matrix may comprise one or more levels of said recursion.

The second switch matrix may comprise: a third switch matrix, the third switch matrix being capable of directing signals received at the second intermediate ports to multiple fourth intermediate ports; a fourth switch matrix, the fourth switch matrix being capable of directing signals received at multiple fifth intermediate ports to multiple sixth intermediate ports, the number of the fifth intermediate ports being less than the number of the second intermediate ports; one or more secondary bypass links, each secondary bypass link being capable of coupling one or more of the fourth intermediate ports to a respective one or more of the third intermediate ports of the circuit independently of the fourth switch matrix; a third redirection layer, the third redirection layer being capable of, for each fourth intermediate port, directing a signal received at that fourth intermediate port to a secondary bypass link or to a fifth intermediate port.

The second switch matrix may comprise a fourth redirection layer, the fourth redirection layer being capable of directing signals received at each of the secondary bypass links to a respective one or more third intermediate ports, and directing signals received at each of the sixth intermediate ports to a respective one or more third intermediate ports.

The number of the fifth intermediate ports may be half the number of the second intermediate ports.

The number of the fourth intermediate ports may be equal to the number of the third intermediate ports. The number of the fourth intermediate ports may be equal to the number of the second intermediate ports.

The third redirection layer may be capable of, for each fourth intermediate port, directing a signal received at that fourth intermediate port to a secondary bypass link or to a fifth intermediate port in preference on whether that signal is addressed to a third intermediate port to which that fourth intermediate port is capable of being coupled via that secondary bypass link.

The third redirection layer may be configured to, for each fourth intermediate port: preferentially direct a signal received at that fourth intermediate port to a secondary bypass link if that signal is addressed to a third intermediate port to which that fourth intermediate port is arranged to be coupled via that secondary bypass link; and preferentially direct a signal received at that fourth intermediate port to a fifth intermediate port if that signal is not addressed to a third intermediate port to which that fourth intermediate port is arranged to be coupled via that secondary bypass link.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Figure 1:
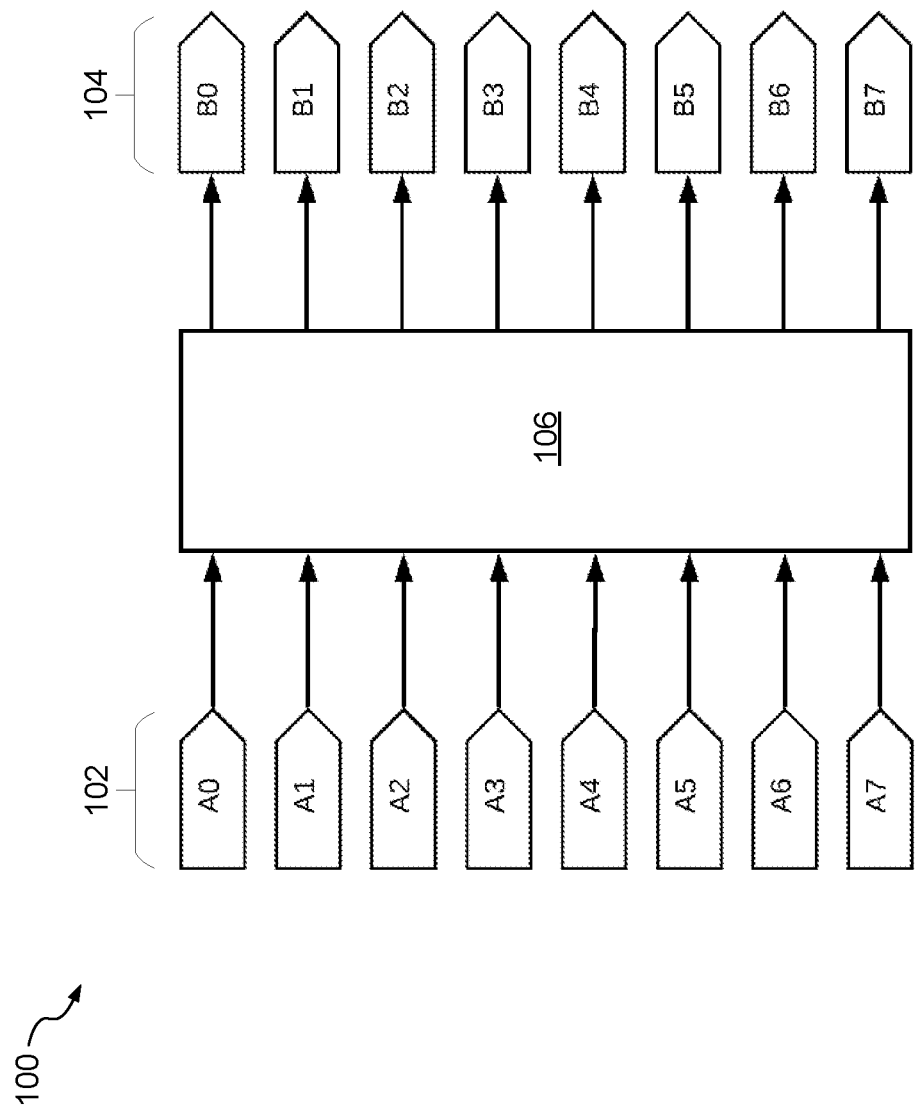
FIG. 1 shows a schematic example of an interconnect circuit having multiple inputs and multiple outputs.

As described herein, FIG. 1 shows a schematic example of an interconnect circuit 100 having multiple inputs 102 and multiple outputs 104. Switch matrix 106 is capable of switching signals received at any of the inputs 102 to any of the outputs 104. In order to achieve this, switch matrix 106 may comprise one or more switches, each switch capable of directing signals received at any of x inputs thereto to any of x outputs thereof, where x>1. An example of a suitable switch is a Banyan switch.

Figure 2A:
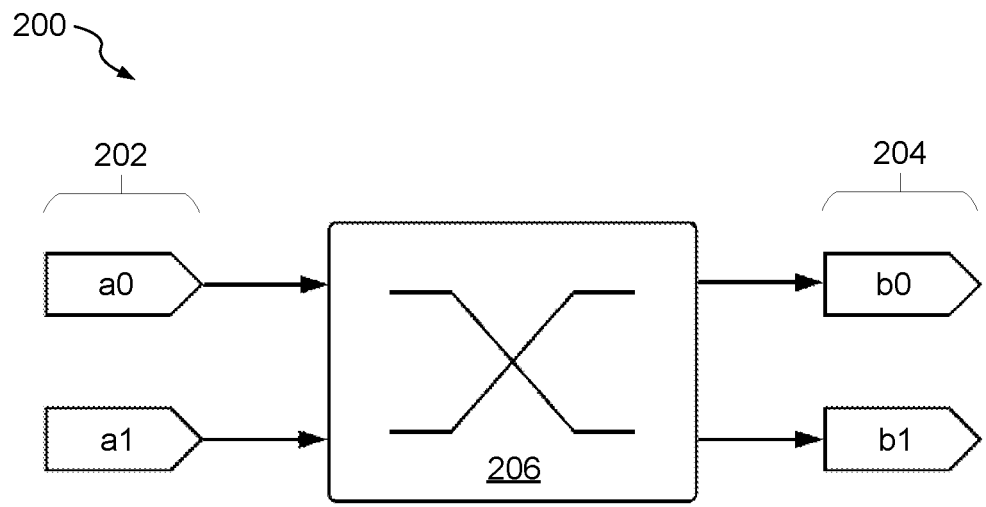
FIG. 2A shows a schematic example of a switch.

FIG. 2A shows a schematic example of a switch. The switch 200 shown in FIG. 2A may be referred to herein as a Banyan switch—which is a known type of switch. Switch 200 has two inputs 202 (often referred to as "input ports"), labelled a0 and a1. Switch 200 has two outputs 204 (often referred to as "output ports"), labelled b0 and b1. Switch 200 is capable of switching signals received at either of its inputs 202 to either of its outputs 204 using switching element 206. For example, a signal received at input a0 can be directed to either output b0 or output b1, and a signal received at input a1 can be directed to either output b0 or output b1. That is, for the example switch 200 shown in FIG. 2A, x equals 2. In other words, the switch 200 shown in FIG. 2A may be referred to as a 2×2 Banyan switch. A Banyan switch may only be capable of passing a signal through (e.g. from a0 to b0, or a1 to b1) or crossing that signal over (e.g. from a0 to b1, or a1 to b0). That is, a Banyan switch may not be capable of fanning a signal received at one input to both of the outputs (e.g. from a0 to b0 and b1, or from a1 to b0 and b1).

It is to be understood that a switch as described herein may comprise any other suitable number of inputs and outputs, e.g. x may equal 3, 4, 5, 6, or any other suitable number as would be well understood by the skilled person. It is to be understood that a switch as described herein need not be a Banyan switch, and could be any other suitable type of switch as would be well understood by the skilled person.

Figure 2B:
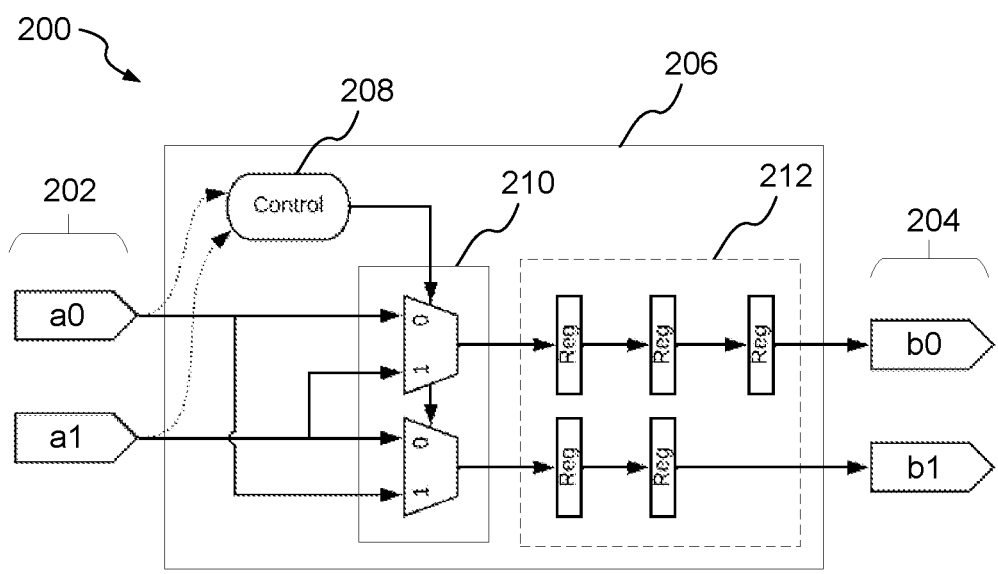
FIG. 2B shows an example implementation of a switch.

For completeness, FIG. 2B shows an example implementation of a switch—although it is to be understood that various ways of implementing such a switch would be well understood by the skilled person. Specifically, FIG. 2B shows an example implementation of the 2×2 Banyan switch shown schematically in FIG. 2A. As described herein, switch 200 has two inputs 202, labelled a0 and a1, and two outputs 204, labelled b0 and b1. FIG. 2B also shows switching element 206, comprising control logic 208, multiplexers 210, and optionally one or more registers 212.

A signal received at one of the inputs 202 may comprise a payload (e.g. the data to be conveyed) and routing information from which it can be derived which of the outputs 204 to which that signal is addressed. For example, where that switch is part of a switch matrix of an interconnect circuit, the routing information may indicate that a signal is addressed to an output of the interconnect circuit. In this example, the output 204 of the switch 200 to which that signal is addressed can be derived by assessing which outputs of the interconnect circuit each output 204 of the switch 200 is capable of being coupled to (e.g. directly, or indirectly such as via other switches or links comprised by the interconnect circuit). In another example, a signal may be specifically addressed to an output 204 of a switch. The routing information may be used by control logic 208 in order to configure multiplexers 210. For example, if an input were to be received at input a0 that the control logic 208 derives is addressed to output b1, control logic 208 may configure the multiplexers 210 such that the signal received on line 1 of the lowermost multiplexer is propagated through that multiplexer.

It is to be understood that a signal received at one of the inputs 202 may optionally comprise additional information to be used by control logic 208. For example, a signal may comprise information indicating whether, and/or how many times, that signal has previously been deviated (e.g. directed to an output to which it was not addressed) by switches in previous stages of a switch matrix. This type of information can be used by control logic 208 in order to prioritise one signal over another in the event that two signals addressed to the same output are received at the switch at a substantially the same time. For example, the signal of those two signals that has not been deviated, or that has been deviated fewer times, may be prioritised on the basis that it has a higher probability of reaching the output to which it is addressed.

Switching element 206 may also optionally comprise one or more registers 212. As would be well understood by the skilled person, registers can be used in order to introduce delays in signal paths, e.g. so as to define the length of a "clock" for a circuit.

As described herein, the example implementation of a switch shown in FIG. 2B has two inputs thereto and two outputs therefrom. It is to be understood that the skilled person would also understand how to implement a switch having greater than two inputs thereto and two outputs therefrom (e.g. a 3×3 Banyan switch, a 4×4 Banyan switch, or any other suitable size or type of switch).

Figure 3:
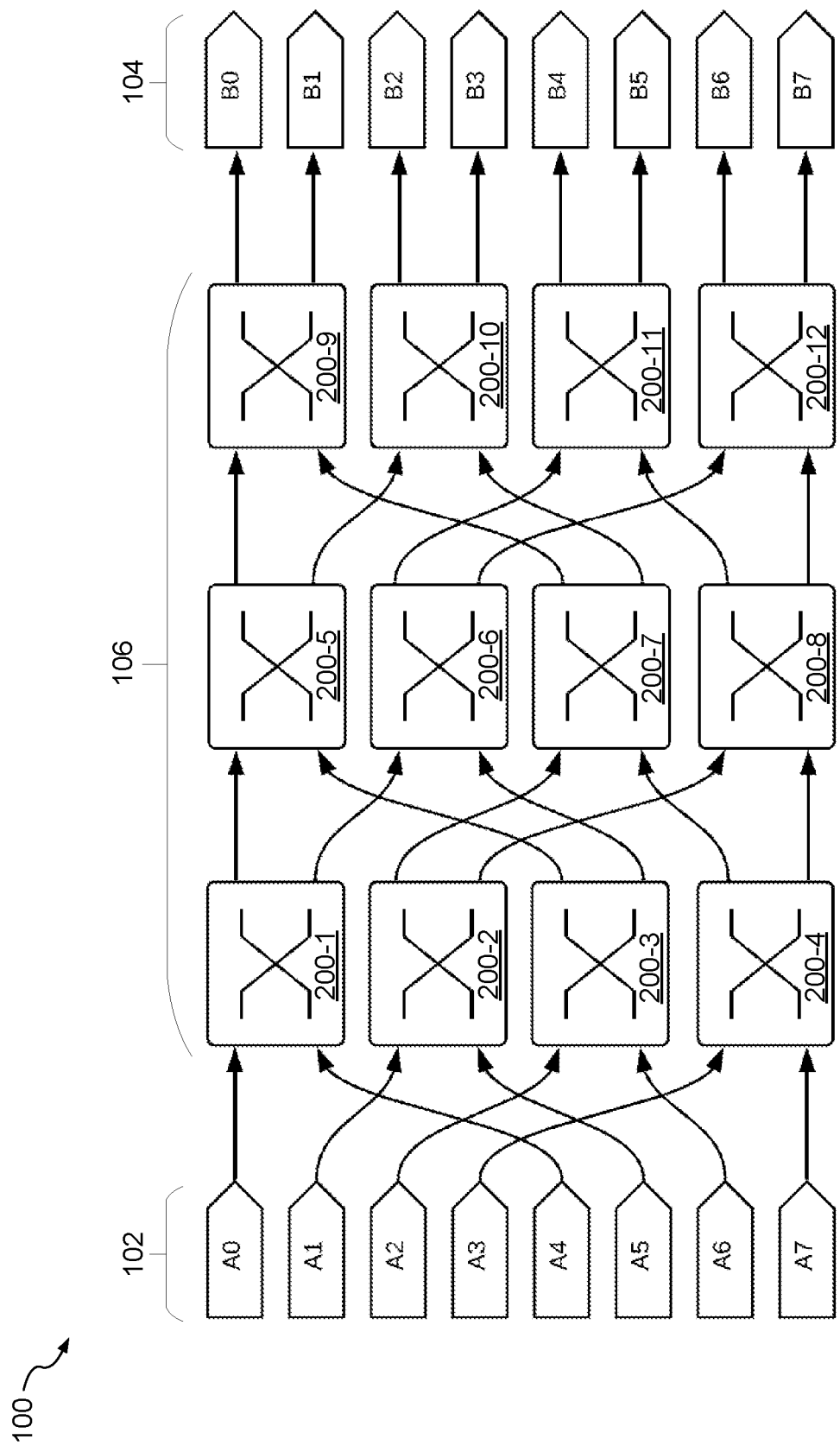
FIG. 3 shows an example interconnect circuit implemented using a plurality of switches.

FIG. 3 shows an example interconnect circuit implemented using a plurality of switches. FIG. 3 shows an example implementation of the interconnect circuit 100 shown schematically in FIG. 1.

Interconnect circuit 100 shown in FIG. 3 has eight inputs 102 (often referred to as "input ports"), labelled A0, A1, A2, A3, A4, A5, A6, and A7. Interconnect circuit 100 in FIG. 3 has eight outputs 104 (often referred to as "output ports"), labelled B0, B1, B2, B3, B4, B5, B6, and B7.

Switch matrix 106 comprises a plurality of switches, labelled 200-1, 200-2, 200-3, 200-4, 200-5, 200-6, 200-7, 200-8, 200-9, 200-10, 200-11 and 200-12. That is, switch matrix 106 shown in FIG. 3 comprises twelve switches. Each of said switches may have the same properties as switch 200 described with reference to FIGS. 2A and 2B. The switches of a switch matrix can be arranged in a series of interconnected stages (e.g. layers, or columns). Switch matrix 106 shown in FIG. 3 is arranged in three stages: a first stage comprising switches 200-1, 200-2, 200-3 and 200-4; a second stage comprising switches 200-5, 200-6, 200-7 and 200-8; and a third stage comprising switches 200-9, 200-10, 200-11 and 200-12. Switch matrix 106 can be referred to as a "multistage" interconnect.

Interconnect circuit 100 shown in FIG. 3 is capable of switching signals received at any of the inputs 102 to any of the outputs 104 using switch matrix 106—following signal paths represented by the arrows shown between switches in FIG. 3. For example, a signal received at input A0 can be directed by switch matrix 106 to any of outputs B0, B1, B2, B3, B4, B5, B6, and B7. The same could be said for any of inputs A1, A2, A3, A4, A5, A6, and A7. Interconnect circuit 100 shown in FIG. 3 is capable of simultaneously directing signals received at multiple inputs to multiple respective outputs. Interconnect circuit 100 shown in FIG. 3 is an example of an Omega network—which is a known type of interconnect circuit that would be well understood by the skilled person.

As described herein, the example Omega network shown in FIG. 3 is capable of switching signals received at any of eight inputs 102 and to any of eight outputs 104. It is to be understood that, more generally, an Omega network may have any suitable number of inputs and outputs. The skilled person would understand how to implement an Omega network capable of switching signals received at any of greater than, or fewer than, eight inputs and to any of greater than, or fewer than, eight outputs. For example, it is known that an Omega network capable of switching signals received at any of N inputs to any of N outputs can be implemented using a switch matrix comprising $\log_2(N)$ stages, each stage comprising N/2 2×2 Banyan switches.

As described herein, the example Omega network shown in FIG. 3 is implemented using a plurality of switches having two inputs thereto and two outputs therefrom (e.g. 2×2 Banyan switches). It is to be understood that the skilled person would understand how to implement an Omega network using one or more larger switches—that is, one or more switches having greater than two inputs thereto and two outputs therefrom (e.g. using 3×3 Banyan switches, 4×4 Banyan switches, or any other suitable size or type of switch).

As described herein, it is known that interconnect circuits, such as Omega networks, suffer from "blocking"—as would be well understood by the skilled person. For completeness, the concept of blocking can be understood with reference to FIG. 4, which shows an example of blocking on an interconnect circuit. The interconnect circuit 100 shown in FIG. 4 has the same properties as interconnect circuit 100 described with reference to FIG. 3.

As described herein, blocking can occur when two signals reach an internal node (e.g. switch) of an interconnect circuit at substantially the same time, both signals needing to be directed to the same output of that internal node in order to follow a signal path to the output 104 of the interconnect circuit to which they are addressed.

Figure 4:
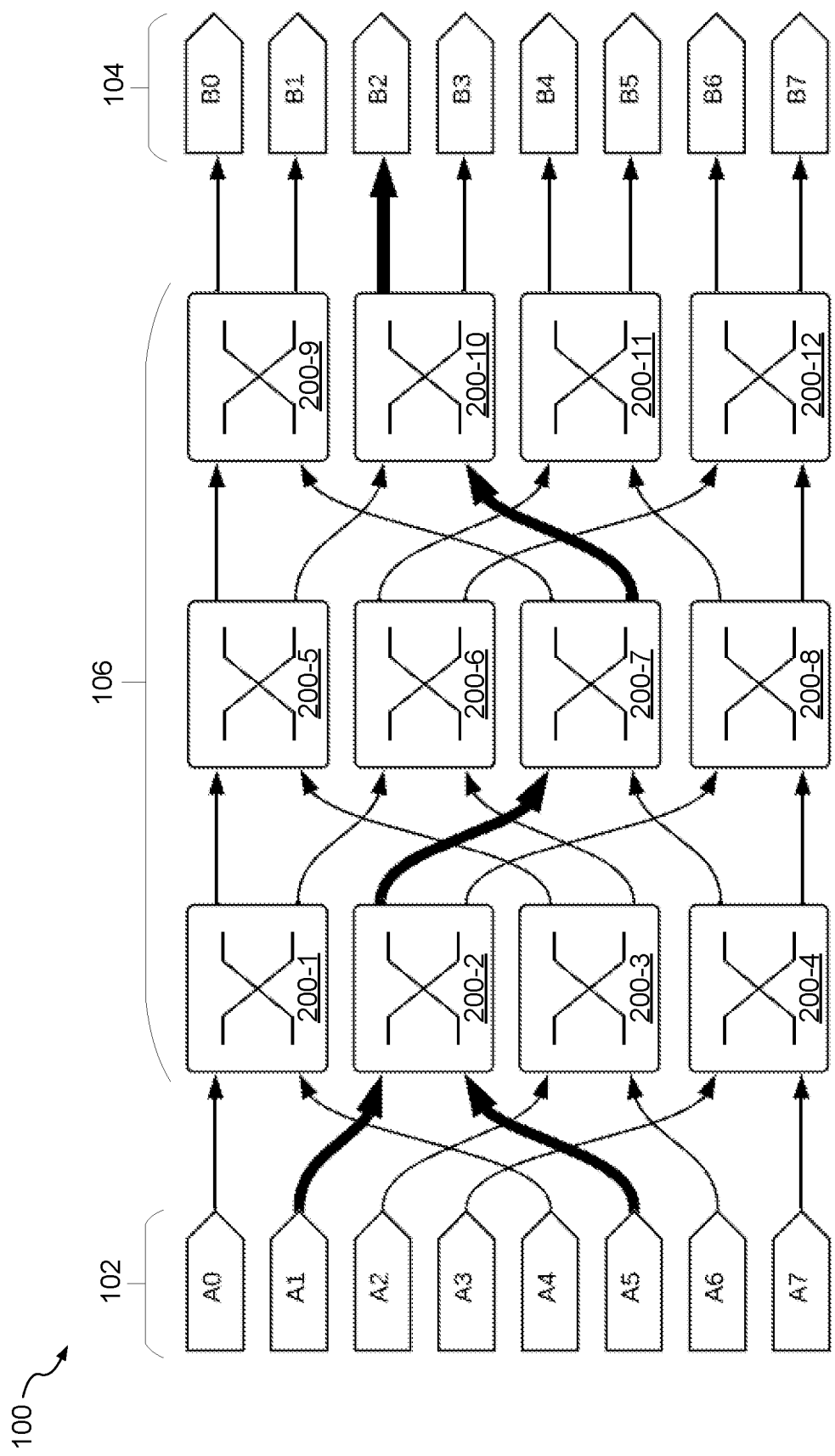
FIG. 4 shows an example of blocking on an interconnect circuit.

In the specific example shown in FIG. 4, signals are received at inputs A1 and A5, each of those signals being addressed to any one of outputs B0, B1, B2, or B3. For example, the signal received at input A1 may be addressed to output B2, and the signal received at input A1 may be addressed to output B0. The signals received at inputs A1 and A5 are directed on respective signal paths, shown using bold arrows, to switch 200-2. These signals "collide" in switch 200-2. That is, only the uppermost output of switch 200-2 is coupled to the outputs to which both signals are addressed. For example, the uppermost output of switch 200-2 is coupled to output B2 indirectly on a signal path, shown in bold arrows, via switches 200-7 and 200-10. Switch 200-2 cannot simultaneously direct both of those signals to its uppermost output. Hence, switch 200-2 directs one of the signals to its uppermost output, and that signal can be directed to the output to which it was addressed (e.g. any of outputs B0, B1, B2 or B3) by switches 200-7, and 200-9 or 200-10. Switch 200-2 directs the other one of the signals to its lowermost output, which is not coupled to any of outputs B0, B1, B2 or B3, and so that signal can only be directed to an output to which it was not addressed (e.g. in this case, any one of outputs B4, B5, B6 or B7) by the subsequent switches of the switch matrix 106. The signal that has been directed to an output to which it was not addressed can be referred to as a "blocked signal".

As described herein, new instance of the payload of the blocked signal can be generated and provided on a signal to the inputs 102 so as to re-attempt switching to the output to which it is addressed. Alternatively, a blocked signal itself can be routed back to the inputs 102 by external logic (not shown in FIG. 4) so as to re-attempt switching to the output to which it is addressed.

FIG. 4 shows a signal collision occurring in a switch in the first stage of a switch matrix 106. That said, it is to be understood that a signal collision could occur in any of the switches of a switch matrix—i.e. in any of the switches in any of the stages of a switch matrix.

It is to be understood that two signals need not necessarily be received at the inputs of an interconnect circuit at substantially the same time for blocking to occur. For example, there may be different levels of delay on different signal paths (e.g. depending on number of registers on each signal path). Thus, signals received at the inputs of an interconnect circuit different times could still collide in a switch if one of those signals is subject to a larger delay than the other such that both signals are received at the switch element of that switch at substantially the same time.

Experiments performed by inventor have shown that, using an Omega network having 1024 inputs and 1024 outputs, implemented using 2×2 Banyan switches, on any one pass of the switch matrix only approximately 50% of signals on average arrive at the output to which they were addressed. That is, approximately 50% of signals on average arrive at an output to which they were not addressed—i.e. are blocked. It is to be understood that, typically, greater percentages of signals are blocked on average in Omega networks having a greater number of inputs and outputs.

Figure 5:
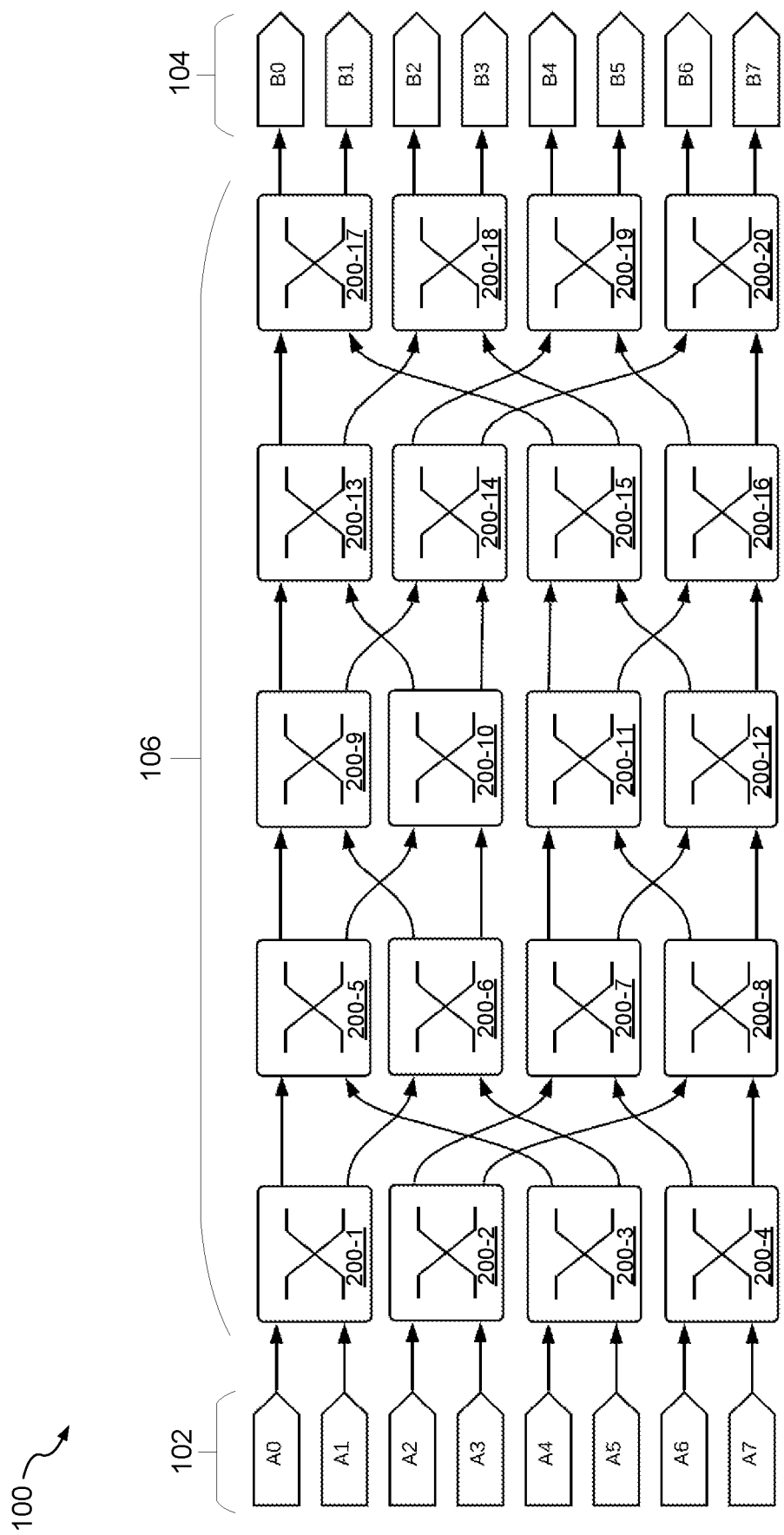
FIG. 5 shows another example interconnect circuit implemented using a plurality of switches.

FIG. 5 shows another example interconnect circuit implemented using a plurality of switches. FIG. 5 shows another example implementation of the interconnect circuit 100 shown schematically in FIG. 1.

Interconnect circuit 100 shown in FIG. 5 has eight inputs 102 (often referred to as "input ports"), labelled A0, A1, A2, A3, A4, A5, A6, and A7. Interconnect circuit 100 shown in FIG. 5 has eight outputs 104 (often referred to as "output ports"), labelled B0, B1, B2, B3, B4, B5, B6, and B7.

Switch matrix 106 comprises a plurality of switches, labelled 200-1, 200-2, 200-3, 200-4, 200-5, 200-6, 200-7, 200-8, 200-9, 200-10, 200-11, 200-12, 200-13, 200-14, 200-15, 200-16, 200-17, 200-18, 200-19, and 200-20. That is, switch matrix 106 shown in FIG. 5 comprises twenty switches. Each of said switches may have the same properties as switch 200 described with reference to FIGS. 2A and 2B. Switch matrix 106 shown in FIG. 5 is arranged in five stages: a first stage comprising switches 200-1, 200-2, 200-3 and 200-4; a second stage comprising switches 200-5, 200-6, 200-7 and 200-8; a third stage comprising switches 200-9, 200-10, 200-11 and 200-12; a fourth stage comprising switches 200-13, 200-,14 200-15 and 200-16; and a fifth stage comprising switches 200-17, 200-18, 200-19 and 200-20. Thus, switch matrix 106 can be referred to as a "multistage" interconnect.

Interconnect circuit 100 shown in FIG. 5 is capable of switching signals received at any of the inputs 102 to any of the outputs 104 using switch matrix 106—following signal paths represented by the arrows shown between switches in FIG. 5. For example, a signal received at input A0 can be directed by switch matrix 106 to any of outputs B0, B1, B2, B3, B4, B5, B6, and B7. The same could be said for any of inputs A1, A2, A3, A4, A5, A6, and A7. Interconnect circuit 100 shown in FIG. 5 is capable of simultaneously directing signals received at multiple inputs to multiple respective outputs. Interconnect circuit 100 shown in FIG. 5 is an example of a Clos network—which is a known type of interconnect circuit that would be well understood by the skilled person.

As described herein, the example Clos network shown in FIG. 5 is capable of switching signals received at any of eight inputs 102 and to any of eight outputs 104. It is to be understood that, more generally, a Clos network may have any suitable number of inputs and outputs. The skilled person would understand how to implement a Clos network capable of switching signals received at any of greater than, or fewer than, eight inputs and to any of greater than, or fewer than, eight outputs. For example, it is known that a Clos network capable of switching signals received at any of N inputs to any of N outputs can be implemented using a switch matrix comprising $2 \log_2(N)-1$ stages, each stage comprising N/2 2×2 Banyan switches.

As described herein, the example Clos network shown in FIG. 5 is implemented using a plurality of switches having two inputs thereto and two outputs therefrom (e.g. 2×2 Banyan switches). It is to be understood that the skilled person would understand how to implement a Clos network using one or more larger switches—that is, one or more switches having greater than two inputs thereto and two outputs therefrom (e.g. using 3×3 Banyan switches, 4×4 Banyan switches, or any other suitable size or type of switch).

Clos networks use a switch matrix architecture designed to minimise blocking. That is, the skilled person would consider Clos networks to be the typical solution for minimising blocking. Clos networks achieve this by providing, relative to Omega networks, a greater number of switches, arranged in a greater number of stages. For example, with reference to FIG. 5, a signal received at input A0 and addressed to output B0 could successfully arrive at output B0 by traversing any of (i) a first signal path via switches 200-1, 200-5, 200-9, 200-13 and 200-17; (ii) a second signal path via switches 200-1, 200-6, 200-9, 200-13 and 200-17; or (iii) a third signal path via switches 200-1, 200-6, 200-10, 200-13 and 200-17. This means that a signal collision in a switch (e.g. switch 200-1 or 200-6) that deviates a signal from one of those signal paths does not necessarily result in that signal being blocked—as alternative signal paths to the desired output are available. By contrast, with reference to FIG. 3, a signal received at input A0 and addressed to output B0 could only successfully arrive at output B0 by traversing a signal path via switches 200-1, 200-5 and 200-9. Hence, a signal collision in any of switches 200-1, 200-5 or 200-9 results in that signal being blocked.

Experiments performed by inventor have shown that, using a Clos network having 1024 inputs and 1024 outputs, implemented using 2×2 Banyan switches, on any one pass of the switch matrix approximately 58% of signals on average arrive at the output to which they were addressed. That is, approximately 42% of signals on average arrive at an output to which they were not addressed—i.e. are blocked. This is an improvement over the Omega network having the same number of inputs and outputs. However, it remains desirable to further reduce the occurrence of blocking in interconnect circuits. It is to be understood that, typically, greater percentages of signals are blocked on average in Clos networks having a greater number of inputs and outputs.

Figure 6:
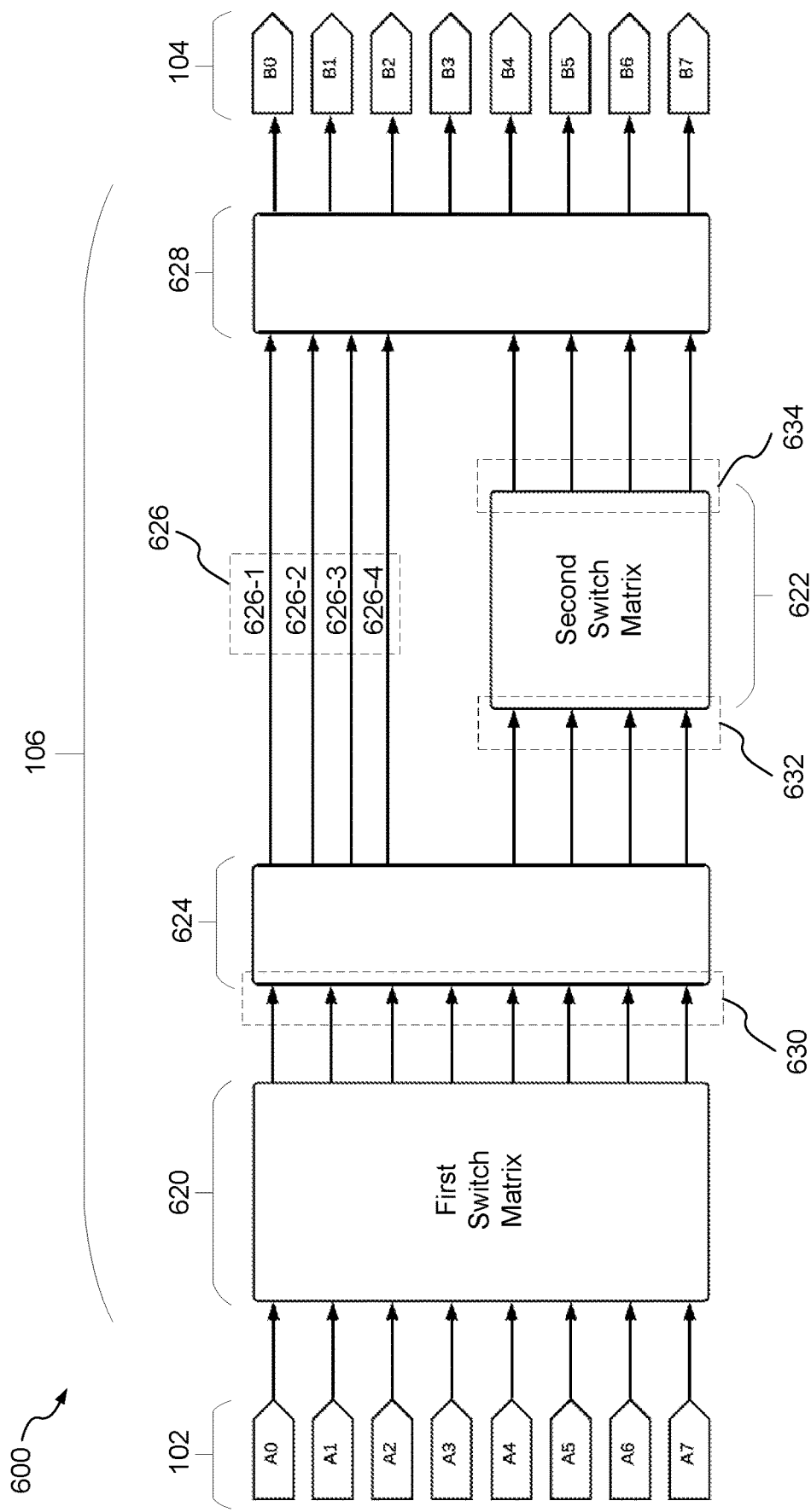
FIG. 6 shows a schematic example of a circuit according to the principles described herein.

FIG. 6 shows a schematic example of a circuit according to the principles described herein. FIG. 6 schematically shows an implementation according to the principles described herein of the interconnect circuit 100 shown schematically in FIG. 1.

Circuit 600 has multiple inputs 102 (often referred to as "input ports") and multiple outputs 104 (often referred to as "output ports"). Circuit 600 shown in FIG. 6 has eight inputs 102, labelled A0, A1, A2, A3, A4, A5, A6, and A7. Circuit 600 shown in FIG. 6 has eight outputs 104, labelled B0, B1, B2, B3, B4, B5, B6, and B7.

Circuit 600 is capable of switching signals received at any of the inputs 102 to any of the outputs 104 using switch matrix 106. For example, a signal received at input A0 can be directed by switch matrix 106 to any of outputs B0, B1, B2, B3, B4, B5, B6, and B7. The same could be said for any of inputs A1, A2, A3, A4, A5, A6, and A7. Circuit 600 shown in FIG. 6 is capable of simultaneously directing signals received at multiple inputs to multiple respective outputs. Thus, circuit 600 may be referred to herein as an "interconnect circuit".

Switch matrix 106 shown in FIG. 6 comprises a first switch matrix 620, a first redirection layer 624, primary bypass links 626, a second switch matrix 622 and a second redirection layer 628—as will be described in further detail in the following.

First switch matrix 620 is capable of directing signals received at the inputs 104 of the circuit 600 to multiple first intermediate ports 630. Circuit 600 shown in FIG. 6 has eight first intermediate ports 630. That is, the number of the first intermediate ports 630 may be equal to the number of the inputs 102 of the circuit, and/or the number of the first intermediate ports 630 may be equal to the number of the outputs 104 of the circuit.

Second switch matrix 622 is capable of directing signals received at multiple second intermediate ports 632 to multiple third intermediate ports 634. The number of the second intermediate ports 632 is less than the number of the inputs 102 of the circuit. Circuit 600 shown in FIG. 6 has four second intermediate ports 632. That is, number of the second intermediate ports 632 may be half the number of the inputs 102 of the circuit.

As described herein, owing to blocking, not all of the signals received at the inputs of an interconnect circuit arrive at the output to which they are addressed. A circuit implemented according to the principles described herein is advantageous because the second switch matrix provides a second opportunity for those signals that have collided with other signals in the first switch matrix and been diverted onto an alternative signal path to be directed to the output to which they are addressed—without requiring the payload of said signals to be re-generated and re-transmitted to the inputs of the circuit or blocked signals themselves being re-routed back to the inputs to the circuit. Thus, is it to be understood that the circuits described herein are advantageous when the number of second intermediate ports is any number less than the number of the inputs of the circuit.

It is to be understood that the second switch matrix 622 could recursively comprise a circuit according to the principles described herein. The second switch matrix may comprise one or more levels of said recursion, up to any suitable number of recursions (e.g. 2, 8, 15, 20, or any suitable number). A specific example of first and second levels of said recursion is provided below.

Each primary bypass link 626 is capable of coupling (e.g. directly, or indirectly such as via other switches or links comprised by the interconnect circuit) one or more of the first intermediate ports 630 to a respective one or more of the outputs 104 of the circuit 600 independently of the second switch matrix 622. That is, each primary bypass link provides a signal path for directing signals received at one or more of the first intermediate ports 630 to a respective one or more of the outputs 104, without those signals traversing the second switch matrix 622.

The number of primary bypass links 626 is less than the number of the inputs 102 of the circuit. Circuit 600 shown in FIG. 6 comprises four primary bypass links, labelled 626-1, 626-2, 626-3 and 626-4 in FIG. 6. That is, number of primary bypass links 626 may be half the number of the inputs 102 of the circuit. It is to be understood that, whilst four primary bypass links are shown in FIG. 6, a circuit according to the principles descried herein may comprise any suitable number of primary bypass links (e.g. one or more).

First redirection layer 624 is capable of, for each first intermediate port 630, directing a signal received at that first intermediate port 630 to a primary bypass link 626 or to a second intermediate port 632. First redirection layer 624 may be capable of, for each first intermediate port 630, directing a signal received at that first intermediate port 630 to a primary bypass link 626 or to a second intermediate port 632 in preference on whether that signal is addressed to an output 104 to which that first intermediate port 630 is capable of being coupled via that primary bypass link 626. That is, the first redirection layer 624 may be configured to, for each first intermediate port 630, preferentially direct a signal received at that first intermediate port 630 to a primary bypass link 626 if that signal is addressed to an output to which that first intermediate port is arranged to be coupled via that primary bypass link 626. The first redirection layer 624 may be configured to, for each first intermediate port 630, preferentially direct a signal received at that first intermediate port 630 to a second intermediate port 632 if that signal is not addressed to an output 104 to which that first intermediate port 630 is arranged to be coupled via that primary bypass link 626. It is to be understood that the terms "in preference" and "preferentially" are used herein because signal collisions in internal nodes (e.g. switches) of the first redirection can prevent a signal from being directed on its preferred signal path—resulting in that signal being directed on an alternative signal path. For example, in the event that two signals are received at a switch element of the first redirection layer 624 at substantially the same time, both of those signals being addressed to an output to which that switch is arranged to be coupled via one primary bypass link 626, those signals may collide in that switch, such that the first redirection layer 624 is only capable of directing one of those signals to that primary bypass link 626 (as preferred), whilst the other signal is directed to a second intermediate port 632.

Second redirection layer 628 shown in FIG. 6 is capable of directing signals received at each of the primary bypass links 626 to a respective one or more outputs of the circuit and directing signals received at each of the third intermediate ports 634 to a respective one or more outputs 104 of the circuit 600.

Experiments performed by inventor have shown that, using a circuit 600 according to the principled described with reference to FIG. 6 having 1024 inputs and 1024 outputs, on any one pass of the circuit approximately 86% of signals arrive at the output 104 to which they were addressed. That is, only approximately 14% of signals arrive at an output 104 to which they were not addressed—i.e. are blocked. This is a significant improvement over both an Omega network having the same number of inputs and outputs (where approximately 50% of signals arrive at the output to which they were addressed), and a Clos network described having the same number of inputs and outputs (where approximately 58% of signals arrive at the output to which they were addressed). In addition, this improvement can be achieved using a similar number of switches as a Clos network having the same number of inputs and outputs—as will be described herein with reference to FIGS. 7 and 8.

Figure 7:
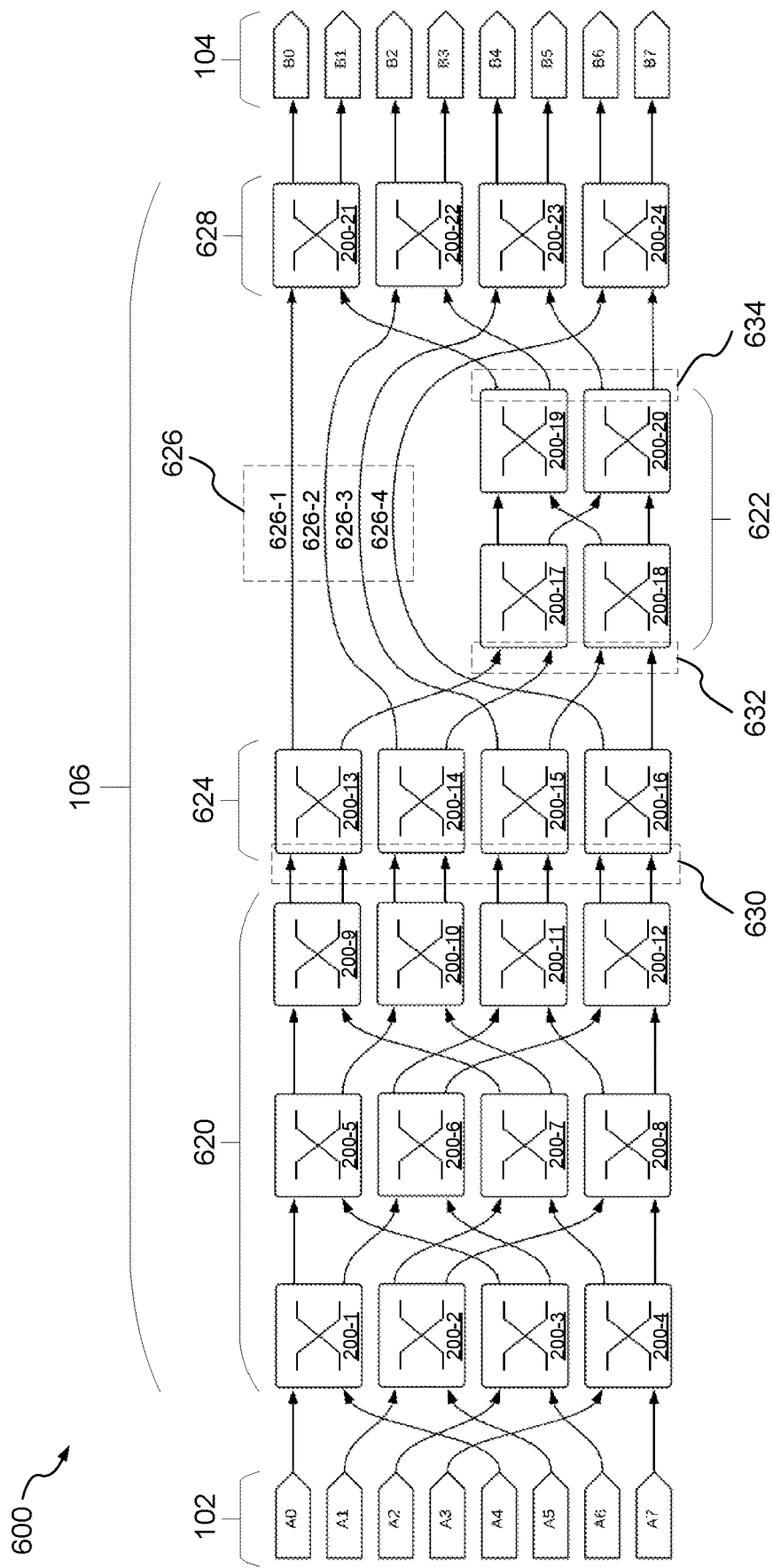
FIG. 7 shows an example implementation of a circuit according to the principles described herein.

FIG. 7 shows an example implementation of a circuit according to the principles described herein.

As shown in FIG. 7, first switch matrix 620 comprises a plurality of switches, labelled 200-1, 200-2, 200-3, 200-4, 200-5, 200-6, 200-7, 200-8, 200-9, 200-10, 200-11 and 200-12. That is, first switch matrix 620 shown in FIG. 7 comprises twelve switches. Each of said switches may have the same properties as switch 200 described with reference to FIGS. 2A and 2B. First switch matrix 620 shown in FIG. 7 is arranged in three stages: a first stage comprising switches 200-1, 200-2, 200-3 and 200-4; a second stage comprising switches 200-5, 200-6, 200-7 and 200-8; and a third stage comprising switches 200-9, 200-10, 200-11 and 200-12. First switch matrix 620 shown in FIG. 7 is capable of switching signals received at any of the inputs 102 to any of the first intermediate ports 630—following signal paths represented by the arrows shown between switches in FIG. 7. That is, first switch matrix 620 shown in FIG. 7 uses an Omega network architecture.

It is to be understood that the skilled person would have no difficulty applying the teaching provided herein to implement a first switch matrix according to the principles described herein using one or more larger switches—that is, one or more switches having greater than two inputs thereto and two outputs therefrom (e.g. using 3×3 Banyan switches, 4×4 Banyan switches, or any other suitable size or type of switch). It is also to be understood that the skilled person would have no difficulty applying the teaching provided herein to implement the first switch matrix 620 according to the principles described herein using a different switch matrix architecture—e.g. a Clos network architecture as described with reference to FIG. 5.

Second switch matrix 622 comprises a plurality of switches, labelled 200-17, 200-18, 200-19, and 200-20. That is, second switch matrix 622 shown in FIG. 7 comprises four switches. Each of said switches may have the same properties as switch 200 described with reference to FIGS. 2A and 2B. Second switch matrix 622 shown in FIG. 7 is arranged in two stages: a first stage comprising switches 200-17 and 200-18; and a second stage comprising switches 200-19 and 200-20. Second switch matrix 620 shown in FIG. 7 is capable of switching signals received at any of the second intermediate ports 632 to any of the third intermediate ports 634—following signal paths represented by the arrows shown between switches in FIG. 7. That is, second switch matrix 620 shown in FIG. 7 uses an Omega network architecture.

It is to be understood that the skilled person would have no difficulty applying the teaching provided herein to implement a second switch matrix according to the principles described herein using one or more larger switches—that is, one or more switches having greater than two inputs thereto and two outputs therefrom (e.g. using 3×3 Banyan switches, 4×4 Banyan switches, or any other suitable size or type of switch). It is also to be understood that the size (e.g. number of inputs thereto and number of outputs therefrom) of the switches used to implement the first switch matrix and the second switch matrix need not be the same.

For example, the first switch matrix may be implemented using 3×3 Banyan switches whist the second switch matrix is implemented using 2×2 Banyan switches. Any other suitable combination of switch sizes could alternatively be used.

It is also to be understood that the skilled person would have no difficulty applying the teaching provided herein to implement the second switch matrix according to the principles described herein using a different switch matrix architecture—e.g. a Clos network architecture as described with reference to FIG. 5.

As described herein, each primary bypass link 626 is capable of coupling (e.g. directly, or indirectly such as via other switches or links comprised by the interconnect circuit) one or more of the first intermediate ports 630 to a respective one or more of the outputs 104 of the circuit 600 independently of the second switch matrix 622. For example, primary bypass link 626-1 is capable of coupling (indirectly, via switches 200-13 and 200-21) the first intermediate port at each of the two outputs of switch 200-9 to either of circuit outputs B0 and B1. That is, a signal received at the first intermediate port at either of the two outputs of switch 200-9 could be directed to either of circuit outputs B0 and B1 by traversing primary bypass link 626-1, and without traversing second switch matrix 622.

First redirection layer 624 comprises a plurality of switches, labelled 200-13, 200-14, 200-15, and 200-16. That is, the first redirection layer 624 comprises four switches. Each of said switches may have the same properties as switch 200 described with reference to FIGS. 2A and 2B. The switches of first redirection layer 624 are arranged in a single stage.

As an illustrative example of the function of the first redirection layer 624, for a signal received at the first intermediate port on the uppermost input of switch 200-13 of the first redirection layer 624, the control logic of switch 200-13 may assess whether that signal is addressed to either output B0 or output B1. If that signal is addressed to either of outputs B0 or B1, switch 200-13 of the first redirection layer 624 may preferentially direct that signal to primary bus link 626-1. If that signal is not addressed to either of outputs B0 or B1, switch 200-13 of the first redirection layer 624 may preferentially direct that signal to the second intermediate port on the uppermost input of switch 200-17 of the second switch matrix.

It is to be understood that the skilled person would have no difficulty applying the teaching provided herein to implement a first redirection layer 624 according to the principles described herein using one or more larger switches—that is, one or more switches having greater than two inputs thereto and two outputs therefrom (e.g. using 3×3 Banyan switches, 4×4 Banyan switches, or any other suitable size or type of switch). In other words, more generally, the first redirection layer 624 may comprise one or more switches, each switch having n inputs thereto to any of n outputs thereof, where n>1. Each switch may be capable of directing signals received at any of its n inputs thereto to any of its n outputs thereof. Each switch of the first redirection layer may be provided with a respective primary bypass link 626. In this way, each primary bypass link 626 may be for coupling n first intermediate ports 630 to a respective one or more outputs 104 of the circuit independently of second switch matrix 622. Alternatively, each switch may be capable of directing signals received at any of its n inputs thereto to a subset of its n outputs thereof (i.e. it is not necessary for each switch of the first redirection layer 624 to be a Banyan switch).

Second redirection layer 628 comprises a plurality of switches, labelled 200-21, 200-22, 200-23, and 200-24. That is, second redirection layer 628 comprises four switches. That is, the first redirection layer 624 and the second redirection layer 628 may have the same number of switches. In this way, each primary bypass link 626 can connect a switch of the first redirection later 624 to a respective switch of the second redirection layer 628. Each of said switches may have the same properties as switch 200 described with reference to FIGS. 2A and 2B. The switches of second redirection layer 628 are arranged in a single stage.

As described herein, second redirection layer 628 is capable of directing signals received at each of the primary bypass links 626 to a respective one or more outputs of the circuit. For example, switch 200-21 of second redirection layer 628 is capable of directing a signal received on primary bypass link 626-1 to either of outputs B0 or B1. As described herein, second redirection layer 628 is capable of directing signals received at each of the third intermediate ports 634 to a respective one or more outputs 104 of the circuit 600. For example, switch 200-21 of second redirection layer 628 is capable of directing a signal received at the third intermediate port at the uppermost output of switch 200-19 to either of outputs B0 or B1.

It is to be understood that the skilled person would have no difficulty applying the teaching provided herein to implement a second redirection layer 628 according to the principles described herein using one or more larger switches—that is, one or more switches having greater than two inputs thereto and two outputs therefrom (e.g. using 3×3 Banyan switches, 4×4 Banyan switches, or any other suitable size or type of switch). In other words, more generally, the second redirection layer 624 may comprise one or more switches, each switch having n inputs thereto to any of n outputs thereof, where n>1. That is, the switches of the first redirection layer 624 and the second redirection layer 628 may have the same number of inputs thereto and outputs thereof. Each switch may be capable of directing signals received at any of n inputs thereto to any of n outputs thereof. In this way, each primary bypass link 626 may connect a switch of the first redirection later 624 to a respective switch of the second redirection layer 628 so as to couple n first intermediate ports to a respective n outputs of the circuit independently of the second switch matrix 622. Alternatively, each switch may be capable of directing signals received at any of its n inputs thereto to a subset of its n outputs thereof (i.e. it is not necessary for each switch of the second redirection layer 628 to be a Banyan switch).

In summary, according to the principles described herein, circuit 600 is capable of coupling any individual one of the multiple inputs 102 to any individual one of the multiple outputs 104 via: (i) at least one signal path that traverses a primary bypass link 626 and does not traverse the second switch matrix 622; and (ii) at least one different signal path that traverses the second switch matrix 622 and does not traverse any of the one or more primary bypass links 626. That is, circuit 600 is capable of simultaneously coupling any individual one of the multiple inputs 102 to any individual one of the multiple outputs 104 via either: (i) a signal path that traverses a primary bypass link 626 and does not traverse the second switch matrix 622; or (ii) at least one different signal path that traverses the second switch matrix 622 and does not traverse any of the one or more primary bypass links 626.

As described herein, circuits according to the principles described herein are advantageous when the number of second intermediate ports is any number less than the number of the inputs of the circuit. That said, circuits implemented according to the teaching of FIG. 7 can be particularly advantageous because the relative number of second intermediate ports to the number of the inputs of the circuit reflects the statistically expected number of signals that will be blocked on average in the first switch matrix. That is, as described herein, the first switch matrix 620 shown in FIG. 7 uses an Omega network architecture. Hence, it can be assumed that, statistically, approximately 50% of signals on average switched by that first switch matrix will arrive at a first intermediate port corresponding to the output of the circuit to which they were addressed, whilst 50% of the signals will have been diverted onto an alternative signal path and require further switching. It is for this reason that, in this example, it can be particularly advantageous to provide a number of primary bypass links 626 equal to half the number of the inputs 102 of the circuit and/or a number of the second intermediate ports 632 equal to half the number of the inputs 102 of the circuit.

In other words, more generally, first redirection layer 624 is configured to attempt to split signals received at the first intermediate ports 630 into two groups: a first group comprising signals that have arrived at a first intermediate port corresponding to the output of the circuit to which they were addressed; and a second group comprising signals that have arrived at a first intermediate port not corresponding to the output of the circuit to which they were addressed (i.e. signals that have been diverted). Of course, whilst the first redirection layer 624 is configured to attempt to split signals in this way, signal collisions in switches of the first redirection layer may prevent a perfect sorting of signals received at the first redirection layer into these groups. One or more primary bypass links 626 are provided for the first group of signals. Multiple second intermediate ports, each second intermediate port being an input to a second switch matrix where further switching can be performed, are provided for the second group of signals. Thus, a particularly advantageous ratio between the number of primary bypass links 626 and the number of second intermediate ports can be selected in dependence on the statistically expected ratio between the number of signals on average that will be split into the first group and the number of signals that will be split into the second group. In the FIG. 7 example, where the first switch matrix is implemented using an Omega network architecture, in light of the inventor's experiments it can be expected that, statistically, there will be, on average, a 1:1 ratio between the number of signals split into the first group and the number of signals split into the second group. Thus, in the example shown in FIG. 7, the 1:1 ratio between the number of primary bypass links 626 and the number of second intermediate ports shown can be particularly advantageous.

As described herein, the first switch matrix 620 can be implemented using a different switch matrix architecture to that shown in FIG. 7. In an example, the first switch matrix 620 can be implemented using a Clos network architecture as described herein with reference to FIG. 5. As explained herein, experiments performed by inventor have shown that, using a Clos network having 1024 inputs and 1024 outputs, implemented using 2×2 Banyan switches, on any one pass of the switch matrix approximately 58% of signals arrive at the output to which they were addressed, whilst approximately 42% of signals are blocked. Hence, in this example, a particularly advantageous circuit according to the principles described herein could be implemented having five primary bypass links (e.g. 62.5% of the number of inputs of the circuit—the closest available percentage in an eight input circuit to the expected 58% of successfully switched signals) and three second intermediate ports (e.g. 37.5% of the number of the inputs of the circuit—the closest available percentage in an eight input circuit to the expected 42% of blocked signals). The skilled person would have no difficulty applying this teaching to implement first and second redirection layers using switches of appropriate type and size so as to achieve this split between the number of primary bypass links and second intermediate ports. It is to be understood that, for circuits having larger numbers of inputs, the percentage split between primary bypass links and second intermediate ports can be closer to the statistically observed percentages of successfully switched and blocked signals. The skilled person would have no difficulty applying the teachings provided herein to select an appropriate split between the number of primary bypass links and the number of second intermediate ports, for example in dependence on the number and inputs of the circuit and an observed statistical percentage of signals blocked on average by the type of switch matrix architecture used for the first switch matrix.

Figure 8:
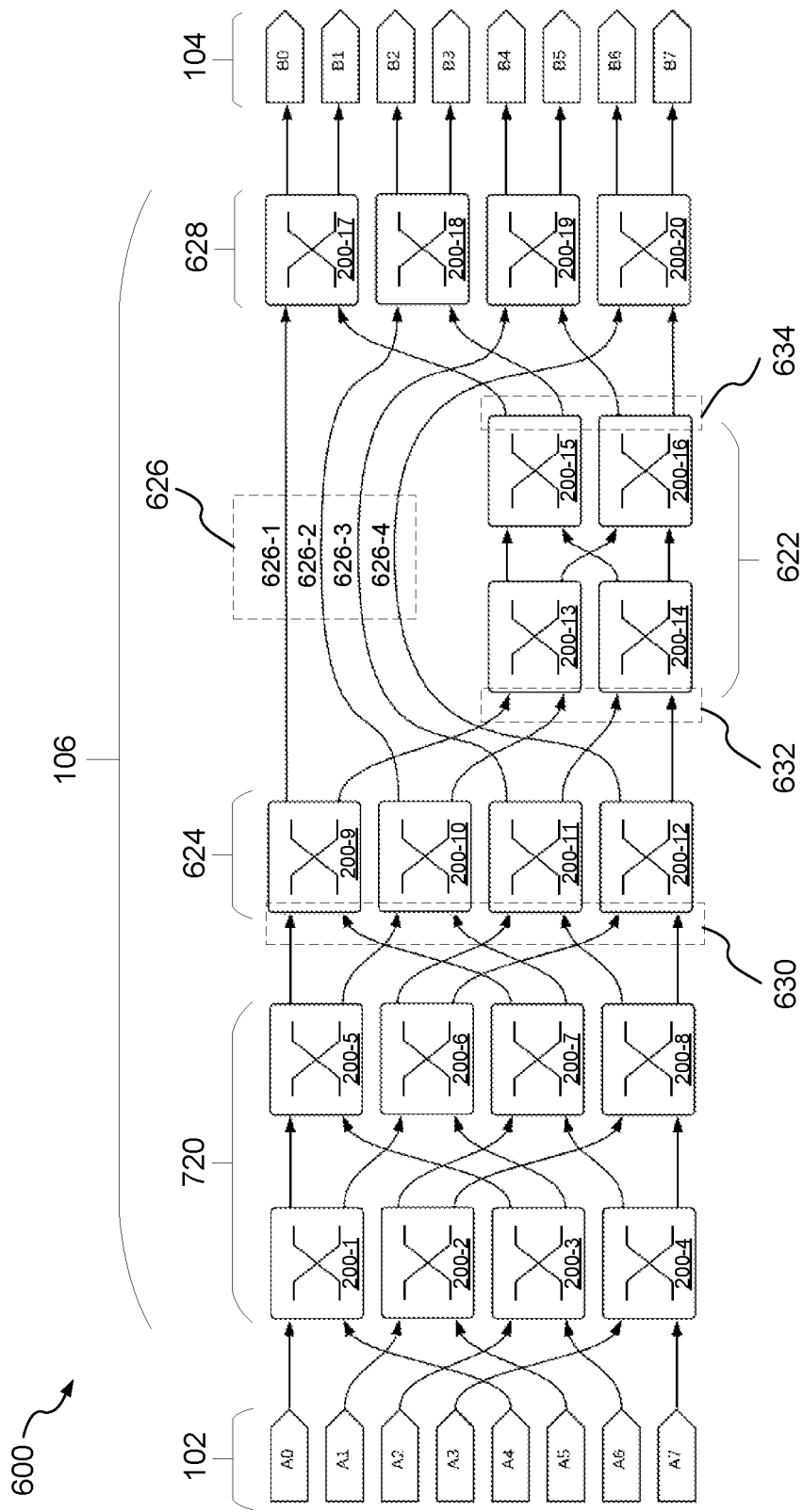
FIG. 8 shows another example implementation of a circuit according to the principles described herein.

FIG. 8 shows another example implementation of a circuit according to the principles described herein. Inputs 102; second switch matrix 622; first redirection layer 624; primary bypass links 626; second redirection layer; first, second and third intermediate ports 630, 632 and 634; and outputs 104 shown in FIG. 8 have the same properties as the corresponding features described with reference to FIG. 7.

FIG. 8 illustrates an optional improvement in examples where the size of switches (e.g. number of inputs thereto and number of outputs therefrom) used to implement the first switch matrix are equal the size of the switches used to implement the first redirection layer. In these examples, the first switch matrix 720 need not be capable of directing signals received at any of the inputs 104 of the circuit to any of the first intermediate ports 630. Instead, the first switch matrix 720 need only be capable of directing signals received at each of the inputs 104 of the circuit 600 to any one of the switches of the first redirection layer 624. This can achieved using fewer switch stages. For example, first switch matrix 720 shown in FIG. 8 comprises a plurality of switches, labelled 200-1, 200-2, 200-3, 200-4, 200-5, 200-6, 200-7, and 200-8. That is, first switch matrix 720 shown in FIG. 8 comprises eight switches—four switches fewer than first switch matrix 620 shown in FIG. 7. Each of said switches may have the same properties as switch 200 described with reference to FIGS. 2A and 2B. First switch matrix 720 shown in FIG. 8 is arranged in two stages: a first stage comprising switches 200-1, 200-2, 200-3 and 200-4; and a second stage comprising switches 200-5, 200-6, 200-7 and 200-8. That is, first switch matrix 720 could be said to use a modified Omega network architecture, where the final stage of a typical Omega network architecture is omitted. The omission of said stage means that circuit 600 shown in FIG. 8 can be implemented using fewer switches, and so using less on-chip area. That said, the omission of said stage does not negatively affect the switching performance of circuit 600 shown in FIG. 8 relative to circuit 600 shown in FIG. 7. For example, consider a signal received at input A0 that is addressed to output B7. Although first switch matrix 720 is not capable of directing that signal to the lowermost input port of switch 200-12 of the first redirection layer (which first switch matrix 620 shown in FIG. 7 would be capable of), first switch matrix 720 shown in FIG. 8 is capable of directing that signal to switch 200-12 that is coupled to both outputs B6 and B7 via primary bypass link 626-4. Thus, said signal can be directed to the output to which it is addressed via primary bypass link 626-4 even though had not been directed to the lowermost output of switch 200-12.

As described herein, the circuits 600 shown in FIGS. 7 and 8 are capable of switching signals received at any of eight inputs 102 and to any of eight outputs 104. It is to be understood that the skilled person would have no difficulty applying the teaching provided herein to implement an interconnect circuit according to the principles described herein having any suitable number of inputs and outputs. That is, the skilled person would have no difficulty implementing an interconnect circuit according to the principles described herein capable of switching signals received at any of greater than, or fewer than, eight inputs and to any of greater than, or fewer than, eight outputs.

It is also to be understood that, in an optional improvement, multiple iterations of the principles described herein can be used in an interconnect circuit. That is, as described herein, the second switch matrix 622 could recursively comprise a circuit according to the principles described herein. The second switch matrix may comprise one or more levels of said recursion, up to any suitable number of recursions (e.g. 2, 8, 15, 20, or any suitable number). For example, the second switch matrix may itself comprise a third switch matrix, a fourth switch matrix, one or more secondary bypass links, a third redirection layer and a fourth redirection layer having equivalent properties to, respectively, the first switch matrix, the second switch matrix, one or more primary bypass links, the first redirection layer and the second redirection layer described herein.

That is, the second switch matrix may comprise; a third switch matrix capable of directing signals received at the second intermediate ports to multiple fourth intermediate ports; a fourth switch matrix capable of directing signals received at multiple fifth intermediate ports to multiple sixth intermediate ports, the number of the fifth intermediate ports being less than the number of the second intermediate ports; one or more secondary bypass links capable of coupling one or more of the fourth intermediate ports to a respective one or more of the third intermediate ports of the circuit independently of the fourth switch matrix; a third redirection layer capable of, for each fourth intermediate port, directing a signal received at that fourth intermediate port to a secondary bypass link or to a fifth intermediate port; and a fourth redirection layer capable of directing signals received at each of the secondary bypass links to a respective one or more third intermediate ports and directing signals received at each of the sixth intermediate ports to a respective one or more third intermediate ports.

It follows that the fourth switch matrix may itself comprise a fifth switch matrix, a sixth switch matrix, one or more tertiary bypass links, a fifth redirection layer and a sixth redirection layer having equivalent properties to, respectively, the first switch matrix, the second switch matrix, one or more primary bypass links, the first redirection layer and the second redirection layer described herein—and so on for any suitable number of iterations (e.g. recursions) of the circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A circuit having multiple inputs and multiple outputs the circuit being for switching signals received at any of the inputs to any of the outputs, the circuit comprising:
 a first switch matrix, the first switch matrix being capable of directing signals received at the inputs of the circuit to multiple first intermediate ports;
 a second switch matrix, the second switch matrix being capable of directing signals received at multiple second intermediate ports to multiple third intermediate ports, the number of the second intermediate ports being less than the number of the inputs of the circuit;
 one or more primary bypass links, each primary bypass link being capable of coupling one or more of the first intermediate ports to a respective one or more of the outputs of the circuit independently of the second switch matrix;
 a first redirection layer, the first redirection layer being capable of, for each of the multiple first intermediate ports, directing a signal received at that first intermediate port to a primary bypass link or to a second intermediate port; and
 a second redirection layer, the second redirection layer being capable of directing signals received at each of the primary bypass links to a respective one or more outputs of the circuit, and directing signals received at each of the third intermediate ports to a respective one or more outputs of the circuit.

2. The circuit as claimed in claim 1, wherein the number of the second intermediate ports is half the number of the inputs of the circuit.

3. The circuit as claimed in claim 1, wherein the number of the first intermediate ports is:
 equal to the number of the outputs of the circuit; and/or
 equal to the number of the inputs of the circuit.

4. The circuit as claimed in claim 1, wherein the first switch matrix is capable of directing signals received at any of the inputs of the circuit to any of the first intermediate ports.

5. The circuit as claimed in claim 1, wherein the second switch matrix is capable of directing signals received at any of the multiple second intermediate ports to any of the multiple third intermediate ports.

6. The circuit as claimed in claim 1, wherein the first redirection layer is capable of, for each of the multiple first intermediate ports, directing a signal received at that first intermediate port to a primary bypass link or to a second intermediate port in preference on whether that signal is addressed to an output to which that first intermediate port is capable of being coupled via that primary bypass link.

7. The circuit as claimed in claim 1, wherein the first redirection layer is configured to, for each of the multiple first intermediate ports:
 preferentially direct a signal received at that first intermediate port to a primary bypass link if that signal is addressed to an output to which that first intermediate port is arranged to be coupled via that primary bypass link; and
 preferentially direct a signal received at that first intermediate port to a second intermediate port if that signal is not addressed to an output to which that first intermediate port is arranged to be coupled via that primary bypass link.

8. The circuit as claimed in claim 1, wherein:
 the first switch matrix comprises one or more switches, each switch capable of directing signals received at any of m inputs thereto to any of m outputs thereof, where m>1; and/or
 the second switch matrix comprises one or more switches, each switch capable of directing signals received at any of p inputs thereto to any of p outputs thereof, where p>1.

9. The circuit as claimed in claim 1, wherein the first redirection layer comprises one or more switches, each switch capable of directing signals received at any of its n inputs thereto to any of its n outputs thereof, where n>1.

10. The circuit as claimed in claim 9, wherein each switch of the first redirection layer is provided with a respective primary bypass link for coupling n first intermediate ports to a respective one or more outputs of the circuit independently of the second switch matrix.

11. The circuit as claimed in claim 9, wherein the second redirection layer comprises one or more switches, each switch capable of directing signals received at any of its n inputs thereto to any of its n outputs thereof, where n>1, the first redirection layer and the second redirection layer having the same number of switches.

12. The circuit as claimed in claim 11, wherein each primary bypass link connects a switch of the first redirection later to a respective switch of the second redirection layer so as to couple n first intermediate ports to a respective n outputs of the circuit independently of the second switch matrix.

13. The circuit as claimed in claim 9, wherein the first switch matrix is capable of directing signals received at each of the inputs of the circuit to any one of the switches of the first redirection layer.

14. The circuit as claimed in claim 1, wherein the circuit is capable of coupling any individual one of the multiple inputs to any individual one of the multiple outputs via: (i) at least one signal path that traverses a primary bypass link and does not traverse the second switch matrix; and (ii) at least one different signal path that traverses the second switch matrix and does not traverse any of the one or more primary bypass links.

15. The circuit as claimed in claim 1, wherein the second switch matrix recursively comprises a circuit as claimed in claim 1, wherein the second switch matrix comprises one or more levels of said recursion.

16. The circuit as claimed in claim 1, wherein the second switch matrix comprises:
 a third switch matrix, the third switch matrix being capable of directing signals received at the second intermediate ports to multiple fourth intermediate ports;
 a fourth switch matrix, the fourth switch matrix being capable of directing signals received at multiple fifth intermediate ports to multiple sixth intermediate ports, the number of the fifth intermediate ports being less than the number of the second intermediate ports;
 one or more secondary bypass links, each secondary bypass link being capable of coupling one or more of the fourth intermediate ports to a respective one or more of the third intermediate ports of the circuit independently of the fourth switch matrix;
 a third redirection layer, the third redirection layer being capable of, for each of the multiple fourth intermediate ports, directing a signal received at that fourth intermediate port to a secondary bypass link or to a fifth intermediate port; and
 a fourth redirection layer, the fourth redirection layer being capable of directing signals received at each of the secondary bypass links to a respective one or more third intermediate ports, and directing signals received at each of the sixth intermediate ports to a respective one or more third intermediate ports.

17. The circuit as claimed in claim 16, wherein the number of the fifth intermediate ports is half the number of the second intermediate ports.

18. The circuit as claimed in claim 16, wherein the number of the fourth intermediate ports is equal to:
 the number of the third intermediate ports; and/or
 the number of the second intermediate ports.

19. The circuit as claimed in claim 16, the third redirection layer being capable of, for each of the multiple fourth intermediate ports, directing a signal received at that fourth intermediate port to a secondary bypass link or to a fifth intermediate port in preference on whether that signal is addressed to a third intermediate port to which that fourth intermediate port is capable of being coupled via that secondary bypass link.

20. The circuit as claimed in claim 16, wherein the third redirection layer is configured to, for each of the multiple fourth intermediate ports:
 preferentially direct a signal received at that fourth intermediate port to a secondary bypass link if that signal is addressed to a third intermediate port to which that fourth intermediate port is arranged to be coupled via that secondary bypass link; and
 preferentially direct a signal received at that fourth intermediate port to a fifth intermediate port if that signal is not addressed to a third intermediate port to which that fourth intermediate port is arranged to be coupled via that secondary bypass link.

\* \* \* \* \*